May 9, 1939.  F. POTT  2,157,459
CALCULATING MACHINE
Filed March 24, 1934   10 Sheets-Sheet 1

May 9, 1939.  F. POTT  2,157,459
CALCULATING MACHINE
Filed March 24, 1934  10 Sheets-Sheet 2

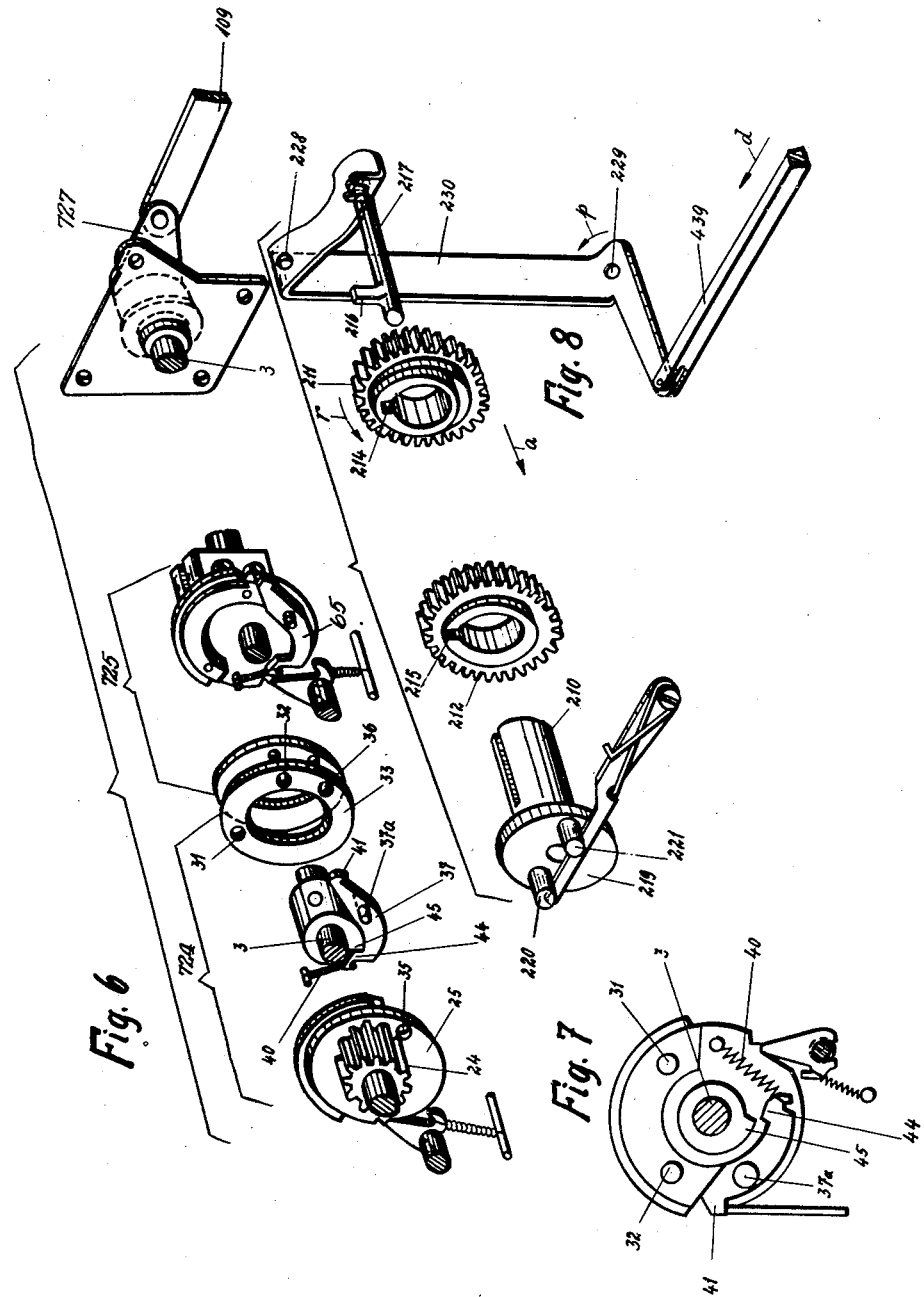

May 9, 1939.  F. POTT  2,157,459
CALCULATING MACHINE
Filed March 24, 1934  10 Sheets-Sheet 6
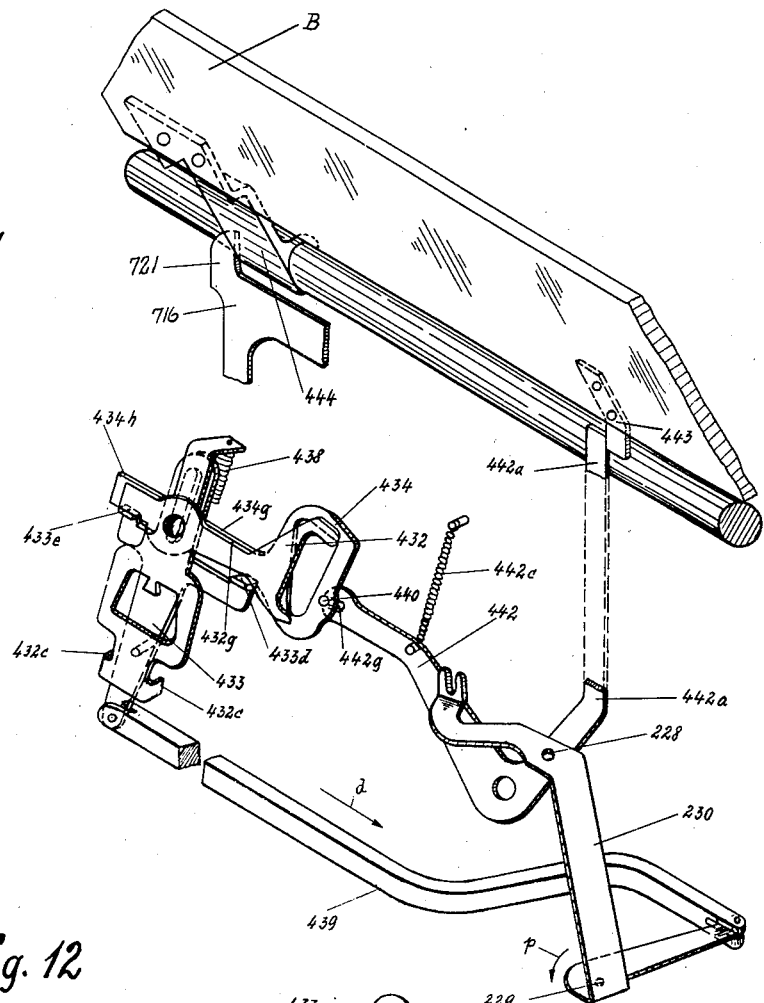
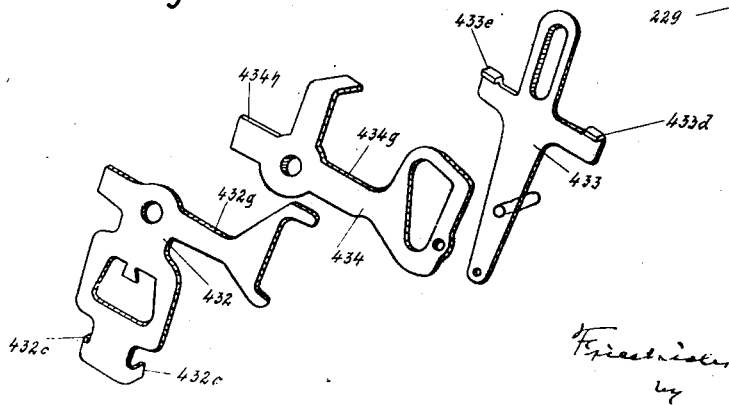

May 9, 1939.　　　　　　　F. POTT　　　　　　2,157,459
CALCULATING MACHINE
Filed March 24, 1934　　　10 Sheets-Sheet 7
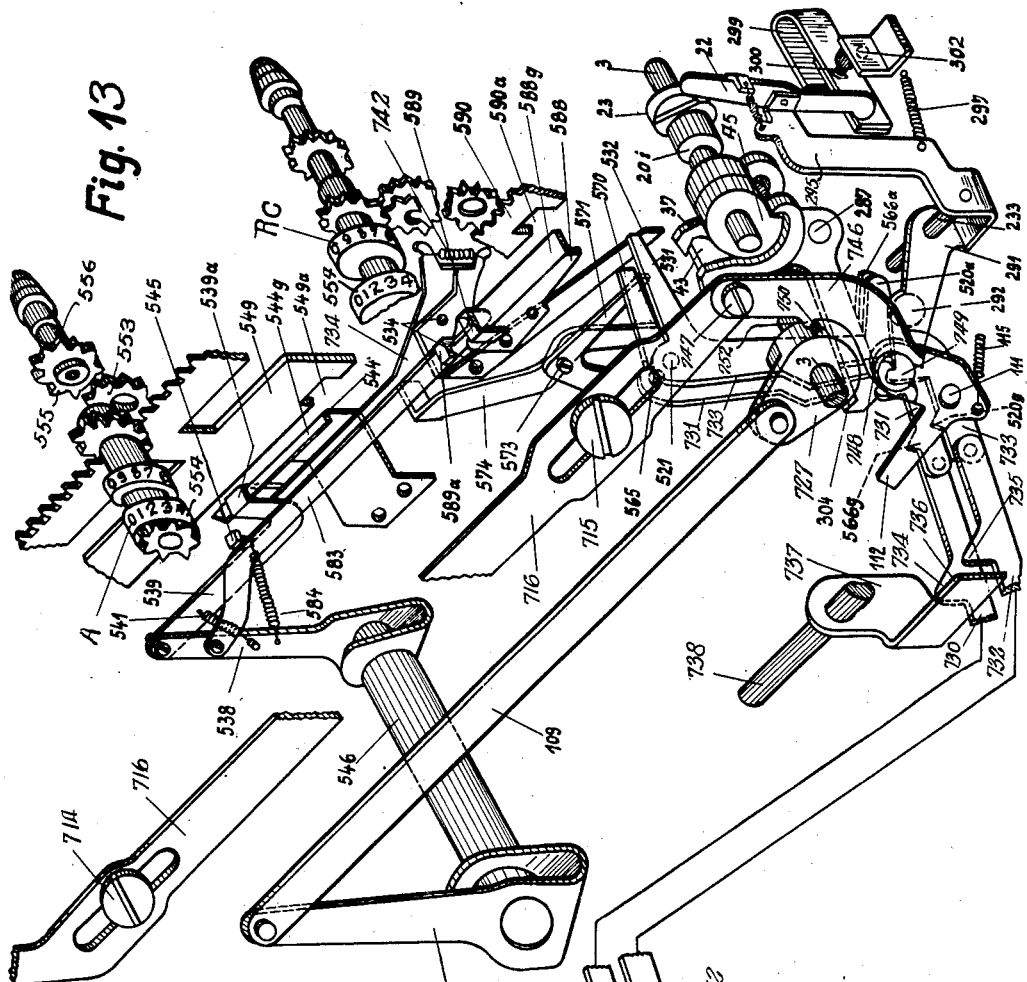
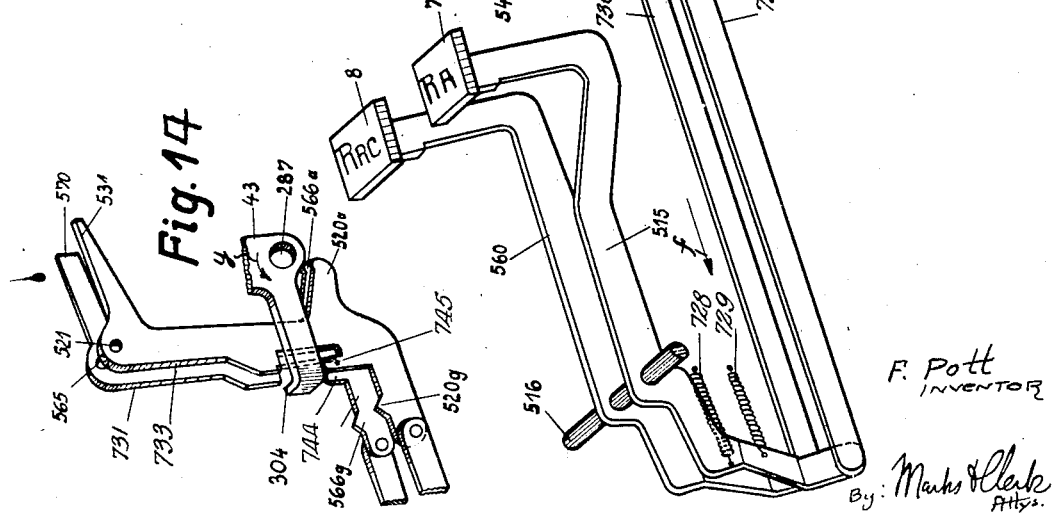
F. Pott
INVENTOR
By: Marks & Clerk
Attys.

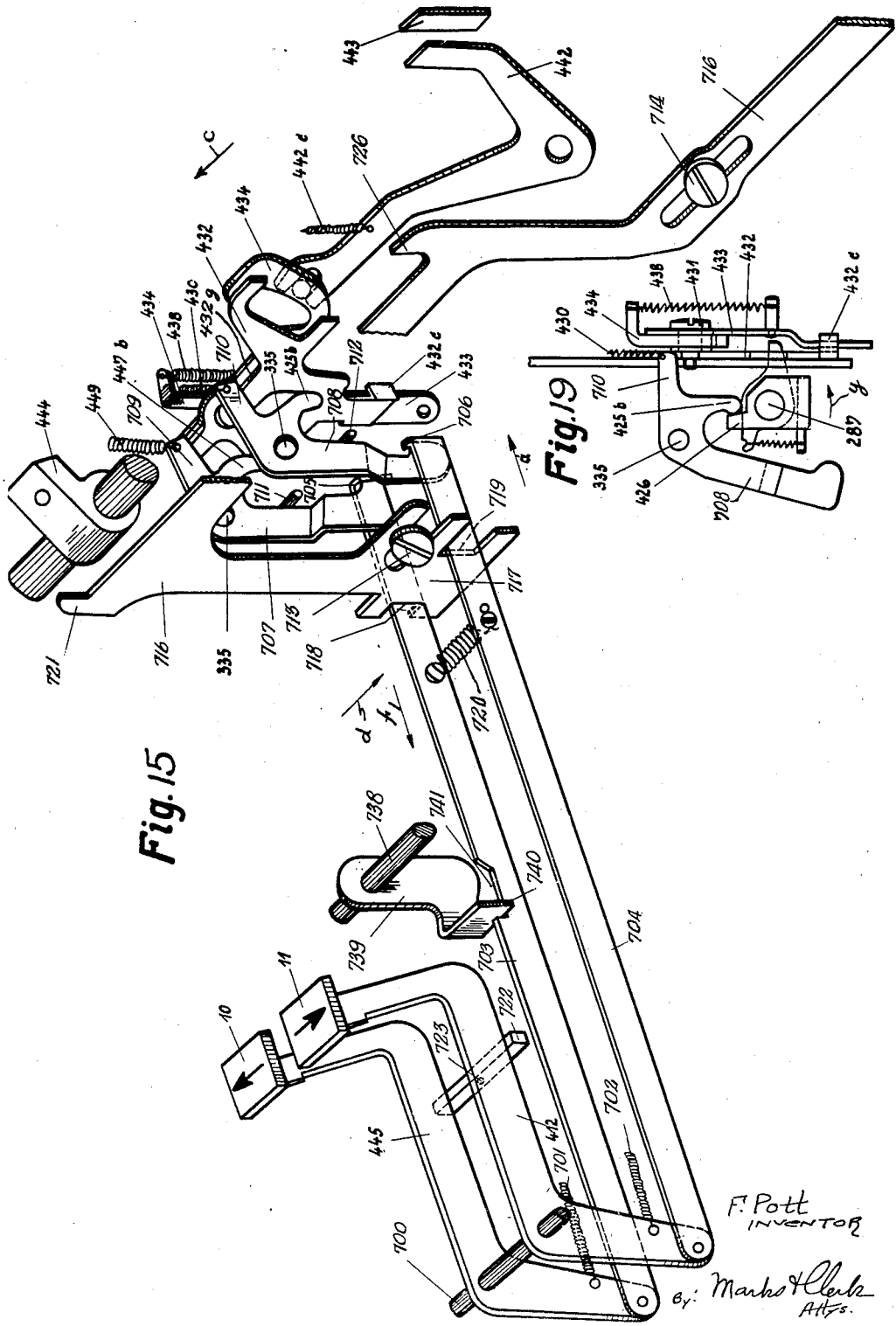

May 9, 1939.  F. POTT  2,157,459
CALCULATING MACHINE
Filed March 24, 1934   10 Sheets-Sheet 10

F. Pott
INVENTOR

By: Marks & Clerk
Attys.

Patented May 9, 1939

2,157,459

UNITED STATES PATENT OFFICE 2,157,459

CALCULATING MACHINE

Friedrich Pott, Zella-Mehlis, Germany, assignor to Mercedes Büromaschinen-Werke Aktiengesellschaft, Benshausen, Thuringia, post office Zella-Mehlis, Germany Application March 24, 1934, Serial No. 717,206
In Germany April 6, 1933

12 Claims. (Cl. 235—63)

The invention relates to a calculating machine.

In these machines it is advantageous to reset the totalizer when a new problem is to be set-up in the machine. In the setting-up of a new problem, it is necessary in most cases to bring the carriage into the extreme left hand position in order to make the most of the capacity of the machine and to avoid incorrect settings. In order, therefore, to be able to set-up a new problem, first the operator must actuate the carriage left shift key so that the carriage arrives in the extreme left hand position, and after that depress the key for the resetting mechanism.

According to the invention, an arrangement is now obtained by means of which this operation is simplified. To that end the carriage shift mechanism is simultaneously and automatically operated by means of the operation of the resetting mechanism, wherein advantageously the resetting members of the resetting mechanism only in one definite position (extreme left hand position) of the totalizer carriage can become operative. It is possible by this arrangement to bring the carriage shift mechanism, as well as the resetting mechanism, by one key depression into a position in which the setting up of the problem can be effected in the most efficient manner.

In the drawings, one example of construction of the object of the invention is represented in combination with a Mercedes Euklid calculating machine now for years on the market of which only so much is illustrated in the drawings as is necessary for the understanding of the invention. This machine is fully disclosed in my patent application Serial No. 564,643 of September 23, 1931.

In the following, those mechanisms which correspond to my said patent application are designated by the same reference numerals as in said application whereas the altered and novel mechanisms are designated from 700 upwards.

Figure 6 is a perspective view of the main drive shaft with the carriage shift clutch viewed from the rear of Figure 1 with the parts separated from one another.

Figure 7 is a section along the line 7—7 of Figure 9, viewed in the direction of the arrows at said line.

Figure 8 is a perspective view with the parts separated from one another of the draw-key clutch for the change gear of the carriage shifting mechanism and the control parts viewed from the rear of Figure 1.

Figure 11 is a perspective of the controlling mechanism for the reversing gear of the carriage shifting mechanism, whereby for the sake of clearness, the rear wall of the carriage together with fragmentary parts of the levers 716 and 442a is separated from its cooperating mechanism.

Figure 12 shows a detail of Figure 11 in which the parts for the sake of clearness are represented separated from one another.

Figure 13 shows an illustration in perspective of the resetting mechanism, arranged in the right-hand part of the machine, with the parts modified according to the invention wherein for the purposes of better understanding various parts are represented broken away.

Figure 14 shows a detail of Figure 13 in perspective representation.

Figure 15 shows an illustration in perspective of the carriage shift mechanism modified according to the invention and arranged in the left-hand part of the machine, the mechanism representing a continuation of Figure 13 to the left and various parts being likewise shown broken off for purposes of better understanding.

Figure 16:
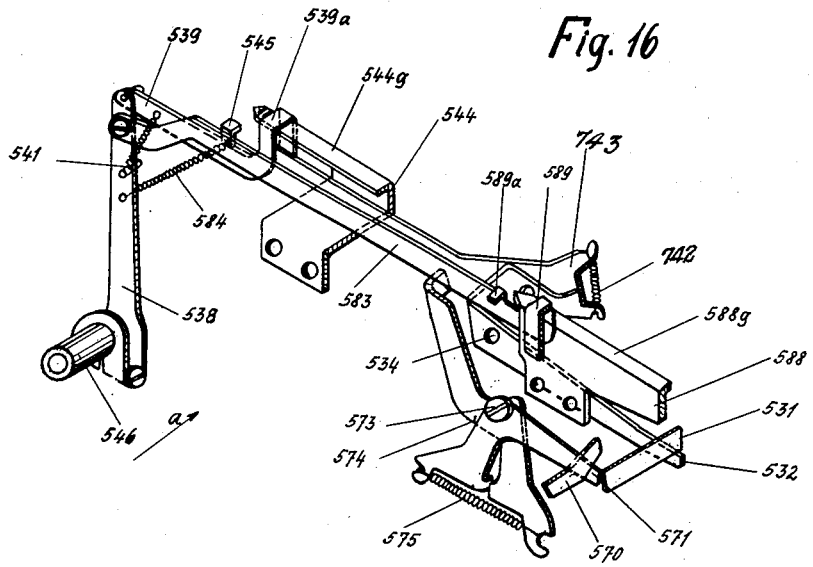

In Figure 16 the mechanisms of Figure 13, which cooperate with the resetting racks are illustrated in perspective.

Figure 17:
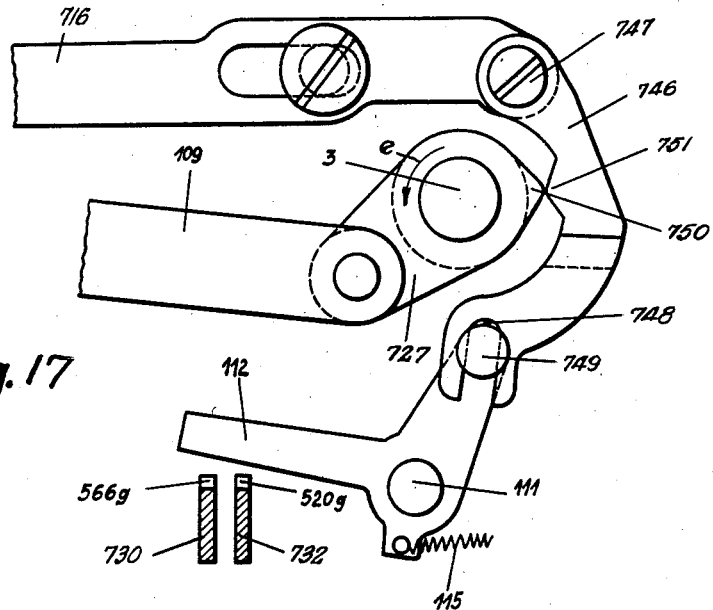

Figure 17 shows a detail of Figure 13, viz., the connecting joint of the resetting mechanism in the working position in relation to the carriage shift mechanism.

Figure 18:
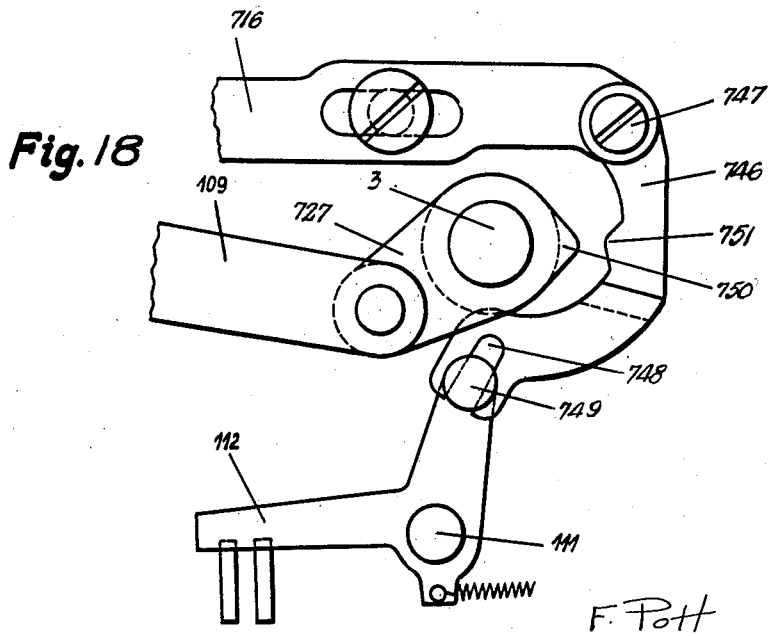

Figure 18 shows the same view as Figure 17 with the mechanism, however, in the rest position.

Figure 19 shows the mechanism for controlling the carriage shift clutch in side elevation viewed in the direction of the arrow c in Figure 15.

Figure 3:
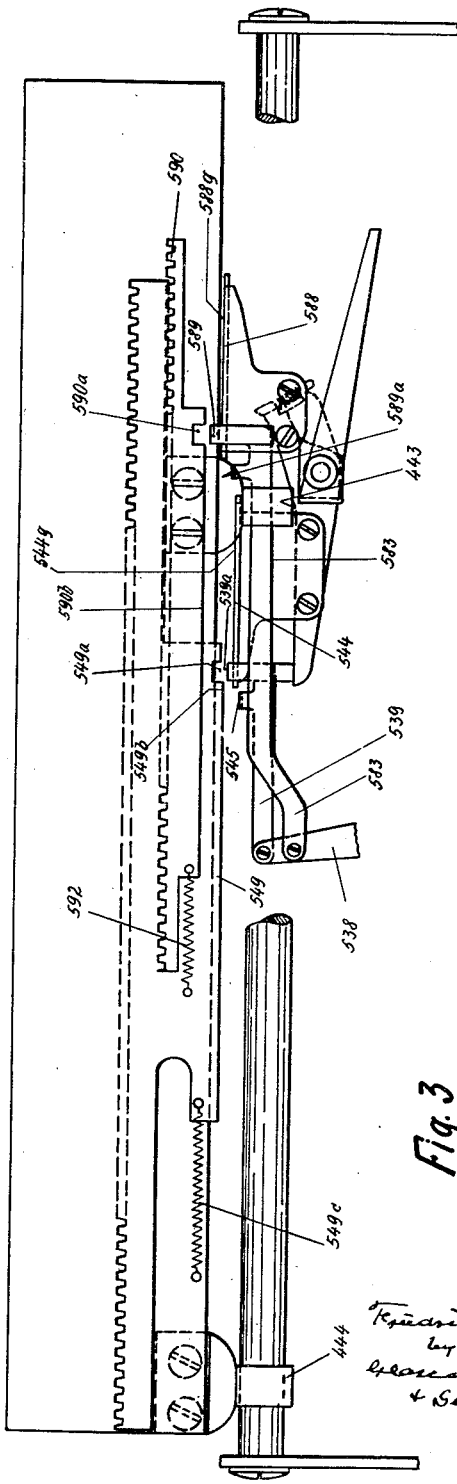
Figure 3 is a fragmentary longitudinal section through the carriage, illustrating the relative position of the resetting mechanism with regard to the carriage in its extreme left hand position.
Figure 20:
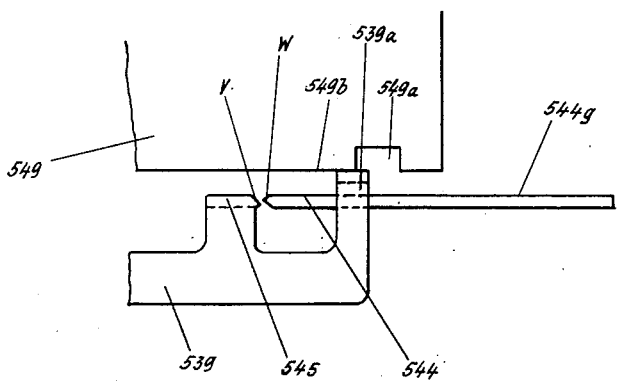

Figure 20 shows on a comparatively large scale a fragmentary view of some parts of Figure 3.

Figure 1:
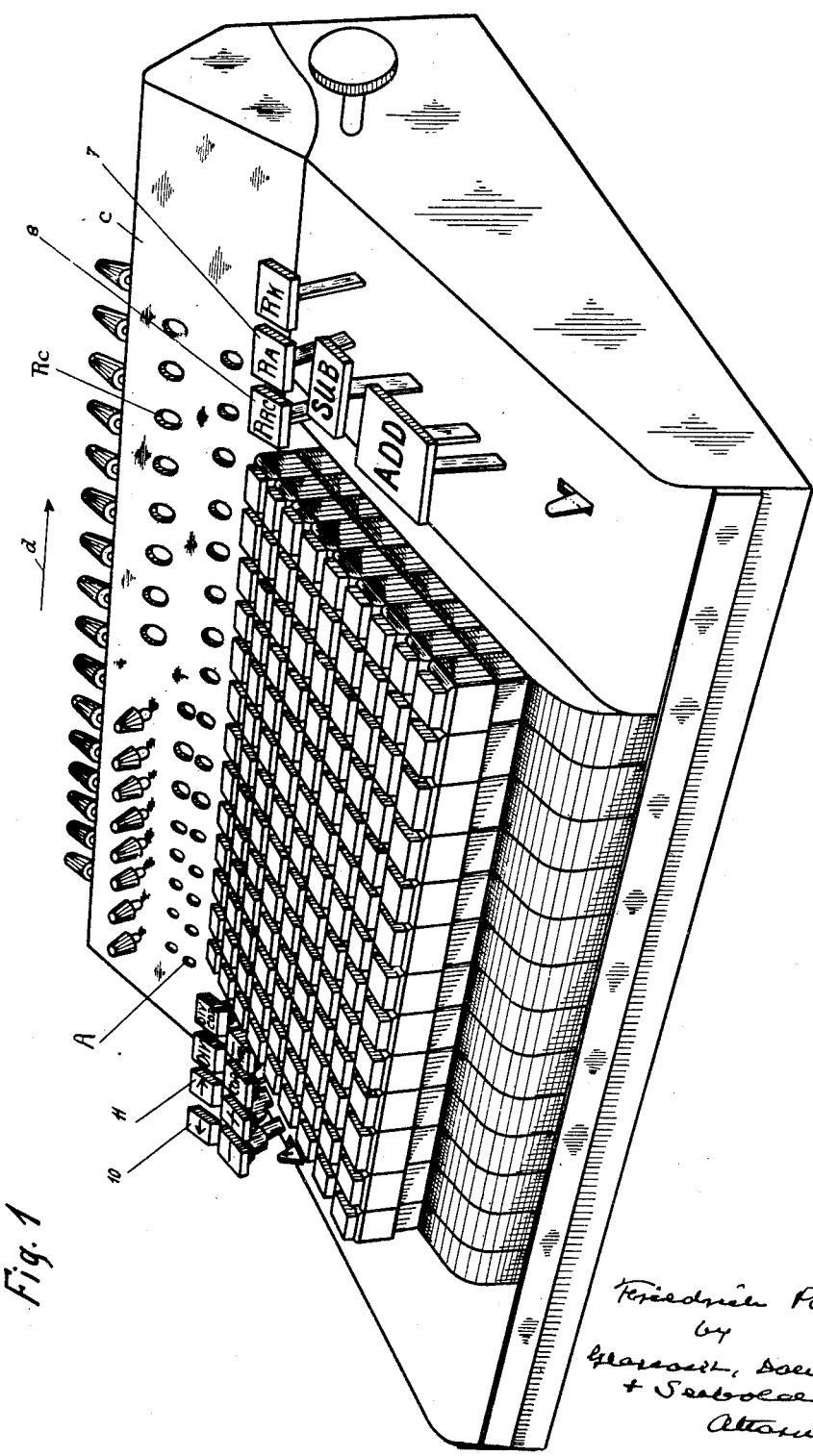
Figure 1 is a view in perspective of a Mercedes Euklid calculating machine.

In the left-hand part of the machine (Figures 1 and 15) the carriage left-shift key lever and the carriage right shift key lever 445 and 412 with the keys 10 and 11 are swingably mounted on a shaft 700. The key levers 445 and 412 are held normally by the tension springs 701 and 702 in their rest position which is determined by the striking of the key levers against the underside of the cover plate (not shown). To the lower ends of the key levers 445 and 412 draw bars 703 and 704 are pivoted which latter are bent at their opposite ends at 705 and 706. These lugs 705 and 706 engage behind levers 707 and 708 which are arranged so as to be swingable around a shaft 335. Horizontal arms 709 and 710 of the levers 707 and 708 engage with lost motion a T-shaped change over cross 432 (Figures 11, 12 and 15) which is swingably mounted on a screw 431 (Figure 19) while they remain without action on a lever 434 which lies behind the change-over cross 432 and is likewise swingable round the screw 431. The levers 707 and 708 are acted on in the anti-clockwise direction by springs 449 and 430 fixed to them whereby their rest position is determined by striking on pins 711 and 712. In this position a little play is present between the lugs 705 and 706 of the draw bars 703 and 704 and the downwardly projecting limbs of the levers 707 and 708. Both of the lugs 705 and 706 of the draw bars 703 and 704 lie opposite to the vertically downwardly directed limbs of the levers 707 and 708 only when the totalizer carriage C (Figure 1) is located in one of its intermediate positions in which the upwardly directed end of a lever 442 (Figure 11) mounted on the machine housing is not engaged by the projection 443 disposed on the totalizer carriage C.

In the Figure 15, the parts are shown in such an intermediate position of the carriage C, whereas Figure 11 shows the carriage C in its extreme left hand position, in which the carriage projection 443 acts on the arm 442a of the angle lever 442 and swings it and the lever 434 into the position illustrated in Figure 11. In this position of the lever 442, the parts 434, 432 and 433 appear rocked in the clockwise direction in which the bar 439 is displaced in the opposite direction of the arrow d. As a consequence the bail 230 is rocked in the direction of the arrow p round the points 228, 229, whereby the draw key 217, 216 (Fig. 8) is displaced in the opposite direction of the arrow "a". Thus the wheel 211 of the carriage reversing gearing 211, 212 is coupled with the bushing 210, which wheel 211 as will be seen later, is the wheel which shifts the carriage to the right.

In the machine housing there is mounted by means of screws 713, 714 and 715, a slide member 716 (Figures 13 and 15) which at its left-hand lower end 717 is provided with recesses 718 and 719 which embrace the draw bars 703 and 704 of the carriage shift keys. Both draw bars 703 and 704 are connected with one another by means of a spring 720 and are thus drawn towards one another, whereby their rest position is determined by the recesses 718 and 719 of the slide member, provided that the carriage C is in one of its intermediate positions as represented in Figure 15. Between the lateral faces of the draw bars 703 and 704 and the lateral faces of the levers 707 and 708, there exists a little play.

If however the carriage C is in its extreme left hand position as represented in Figure 11, the carriage projection 444 has taken the slide bar 716 along with it by means of the nose 721 in the opposite direction of the arrow "d", the nose 721 coming to rest against the left hand side wall of the machine frame. As a result, the part 717 of the bar 716 has displaced the draw bar 703 against the action of the spring 720 so that the bent part 705 of the draw bar 703 is disconnected from the lever 707.

If now, for example, the carriage right-shift key 11 is depressed, then a rocker 722 Fig. 15, swingably mounted round the point 723 and arranged underneath the levers 412 and 445 swings in the clockwise direction and thus prevents the depression of the key 10, whilst the key 11 is held depressed. Further, on the depression of the key, 11, the draw bar 704 is moved against the action of the spring 702, in the direction of the arrow "f". At this movement the lug 706 of the bar 704 takes the lever 708 along with it and swings this lever against the action of its spring 430 in the clockwise direction.

Thus the arm 710 of the lever 708 contacts with the edge 432g (Figs. 11, 12 and 15) without influencing the lever 432, since the latter is already held rocked in clockwise direction by means of the parts 443, 442, 442g, 440, 434, 433e, 433d, 433 and 432. If however, the carriage moves to the right, the carriage projection 443 removes from the upright end of the angle lever 442 and the spring 442c would rock the levers 434, 433 and 432 in anti-clockwise direction which is not desirable because such rocking movement would, by means of the parts 439, 230 (Figure 8) 217 and 216, couple the carriage left shift wheel 212 with the bushing 210. In other words, in all intermediate positions of the carriage C, the arm 710 (Figure 15) of the lever 708 rocks the lever 432 or holds it rocked in clockwise direction as soon as the carriage right shift key is depressed or held depressed. In this way, the carriage right shift wheel 211 is held coupled with the bushing 210, so that if the wheel 211 is rotated the pins 220 and 221 of the bushing 210 which enter the notches 222 of a rack like part 223, fixed to the carriage C will shift the carriage C to the right.

Figure 9:
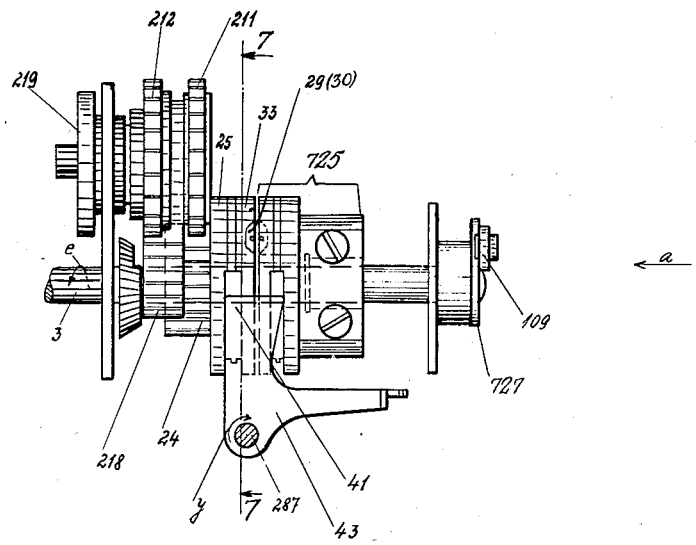
Figure 9 is a view of the main drive shaft with the carriage shift clutch, viewed in the direction of the arrow "d" shown in Figure 1.
Figure 10:
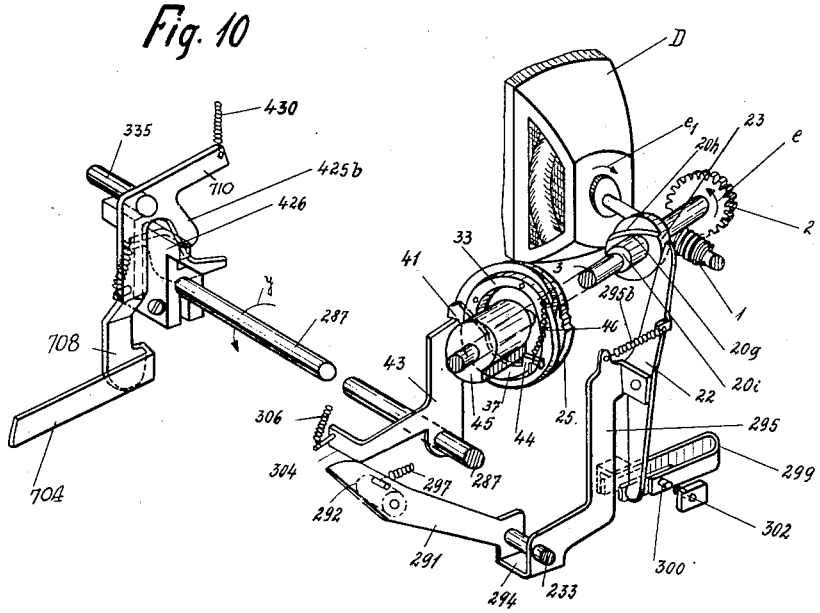
Figure 10 is a perspective of the motor driving connection with motor contact, the carriage shift clutch and in part the controlling means therefor.

The rotation of the wheel 211 is obtained as follows: When the lever 708 is rotated in the clockwise direction, its projection 425b (Figure 19) acts on the part 426, fixed on the shaft 287. As a consequence, the shaft 287 and the clutch control lever 43 (Figs. 9 and 10) fixed on the shaft 287 are rotated in the direction of the arrow y. Thereby the clutch control lever 43 releases the nose 41 of the clutch dog 37 (Figs. 6, 9 and 10). Accordingly, the spring 40 brings the nose 44 of the clutch dog 37 in engagement with the cam 45, fixed on the driving shaft 3. Since the clutch dog 37, by means of its pin 37a is fulcrumed at 35 in the clutch housing 25 and at 36 in the ring 33, fixed at 31 and 32 by means of screws 29 and 30 (Figure 9), the clutch housing 25 will be taken along with the cam 45 as soon as the shaft 3, is rotated in the direction of the arrow e. Accordingly, the wheel 24 which is fixed to the clutch housing 25 is also rotated in the direction of the arrow e. Since wheel 24 is in mesh with wheel 211, the latter is rotated in the direction of the arrow r, whereby, since the wheel 211 is clutched with the bushing 210 by means of the draw key 216, 217 also the bushing 210 with the pin disk 219, 220, 221 is rotated in the direction of the arrow r. This rotation of the pin disk 219 (Figure 2) shifts the carriage C to the right through the intermediary of the pins 221, 220 entering the notches 222 of the rack-like member 223. In the following the carriage shift clutch assembly in its entirety will be designated by the reference numeral 724 (Figs. 6 and 9). At the right of the carriage shift clutch (viewed in Figs. 6 and 9) a similar clutch assembly is arranged which in its entirety is designated by reference numeral 725. This clutch which clutches the driving shaft 3 with the differential mechanism (not shown) does not play any part in the present invention and has only been shown in this connection because its clutch dog 65 cooperates also with cam 45 and clutch control lever 43. The rotation of the shaft 3 is obtained as follows: When the shaft 287 is rotated in the direction of the arrow y (Figure 10), the part 304 of the clutch control lever 43 acts on the lever 291, 294, 295 and rocks the same in the direction of the arrow y. Accordingly, the lever 22 swingably arranged on lever 295 slips off from the part 23. By means of the spring 295b and the spring action of the contact spring 299 itself, the lever 22 is rocked in the anti-clockwise direction and permits the closing of the motor contact 300, 302. As a consequence, the motor D runs and the worm 1 rotates in the direction of the arrow e1, whereby the worm wheel 2 and the shaft 3 are rotated in the direction of the arrow e. Since, as above mentioned, the carriage shift clutch 724 has already been closed, the carriage C is now shifted to the right for such time as the carriage right key 11 is held depressed.

If however, the totalizer carriage thereby runs into its extreme right hand position, then the left hand bearing member 444 (Fig. 15) of the totalizer carriage strikes against the upwardly projecting end 442a of the lever 442, which has been held rocked in the anti-clockwise direction by the lever 434 on depressing the carriage right shift key 11, and swings the lever 442 in the clockwise direction, whereby the lever 434 in consequence of the flexibility introduced by the spring 438 and the elongated slot located in the lever 433, can swing in the anti-clockwise direction independently of the lever 432 which is still held. Immediately thereafter the bearing member 444 also strikes against the nose 726 of the slide member 716 and displaces it in the direction of the arrow "d". Consequently, the draw bar 704 is taken along against the action of the spring 720, and the lug 706 of the draw bar 704, is brought out of engagement with the lever 708 whereby the lever 708 under the action of the spring 430, even if the key 11 at this time is still held depressed, can return into its rest position.

The arm 425b of the lever 708 releases the part 426, thus permitting the shaft 287 to be rocked in the opposite direction to that of the arrow y by means of the spring 306, acting on the bent part 304 of the clutch control lever 43, which thereby is swung in the path of the nose 41 of the clutch dog 37, whereby the carriage shift clutch 724 is again opened. During the rocking movement of the shaft 287 in the opposite direction of the arrow y, the part 304 of the clutch control lever 43 releases also the lever 291, 294, 295, which is now acted upon by the spring 297 in the clockwise direction. This rocking movement takes part as soon as the lever 22 is opposite the point 20g of the shaft 3 which is still rotating. Since the part 23 is cut down at 20h to the level of point 20g, the lever 22 is permitted at this place to slide on to the part 20h under the action of the spring 297. As soon as this occurs the part 20h—the shaft 3 still rotating—rocks the lever 22 in the clockwise direction, bringing thus the lever 22 anew on the circumference of the part 23, whereby the contact 300, 302 is opened. As soon as the lever 22 is again on the circumference of the part 23, the spring 297 still acts and rocks the lever 291, 294, 295 somewhat farther in the clockwise direction, far enough that the lever 22 is out of the plane of the part 20h, so that the lever 22 is again on the unbroken circumference of the parts 23. When the arm 710 of the lever 708 releases the edge 432g of the lever 432, the previously tensioned spring 438 acts on the lever 433, whereby the play which is present between the right arm of the lever 434 and the lug 433d of the lever 433 is taken up, that is, the levers 432 and 433 are swung in the anti-clockwise direction. As a consequence, the bar 439 is shifted in the direction of the arrow d, whereby the bail 230 is swung in the opposite direction of the arrow p. Accordingly the draw key 217, 216 (Figure 8) is shifted in the direction of the arrow a, clutching thus the carriage left shift wheel 212 with the bushing 210. The resilient connection between the levers 434 and 433 by means of the spring 438 is necessary for the following reason: As long as the wheel 211 is clutched with the bushing 210, the wheel 211 rotates in the direction of the arrow r, whereas the wheel 212 by means of the intermediate wheel 218 (Fig. 9) rotates idly in the opposite direction. Accordingly, the draw key 216, 217 may only be displaced in the direction of the arrow "a", when the notches 214, 215 of the wheels 211, 212 are opposite to one another. As soon as this is the case, the spring 438 acts on the parts 433, 439, 230, 217, 216 in the above mentioned sense.

After the release of the key 11, the draw bar 704 is displaced again in the arrow direction "a" under the action of the spring 702 engaging with the lever 412, in which position, nevertheless the lug 706 is held out of action with the lever 708 by the slide member 716 as long as the totalizer carriage retains its extreme right hand position.

As soon however, as the totalizer carriage is moved to the left, the bearing member 444 of the same again releases the nose 726 of the slide member 716, whereby this is returned again into its middle position represented in Figures 15 and 13 by means of the spring 720 and the lug 706 again places itself behind the angle lever 708.

The same operations naturally occur when the carriage left shift key 10 is depressed, in which operations the release of the rod 703 associated with this key 10, results through the striking of the carriage bearing 444 against the nose 721 of the slide member 716.

By the levers 707 and 708 acting only on the lever 432, an independent division in the movement operations is produced between the levers 434 and 442 on the one hand and the levers 432 and 433 on the other hand and further the unpleasantly heavy pressure of the carriage shift key experienced by the operator is avoided, in addition to which the opening of the carriage shift clutch, nevertheless, is effected at the right time by means of the slide member 716, by way of the parts 704 and 708, and 425b or 703, 707 and 447b.

In order to bring the carriage left shift in dependence upon the resetting operation of the totalizers, the following arrangement is provided.

Before proceeding with the description of the resetting mechanism proper, it may be set forth, that a crank arm 727 (Figures 6, 9 and 13) is fixed on the driving shaft 3, which crank arm by means of the parts 109, 547, 546 and 538 moves the links 539 and 583 of the resetting mechanism idly to and fro at any time the driving shaft 3 is rotated.

The keys 8 (Figure 1) for the revolutions counter RC and 7 for the accumulator A, are, swingably mounted on a shaft, 516. They are held by springs 728 and 729 in their upper position which is determined by the striking of the key levers 560 and 515, against the cover plate of the machine. If the resetting key 8 is depressed, then a draw bar 730, connected with it, is drawn forward in the arrow direction "f" and a resetting clutching up lever 731 swingably mounted at 565 is swung in the clockwise direction. The lever 731 is provided with a nose 556g (Figures 13 and 14) which in the forward movement of the rod 730 raises a pawl 112 swingable round 111 against the action of its tension spring 115, whereupon the pawl 112 places itself behind the nose 566g of the resetting clutching up lever 731, which is thus held in the forwardly drawn position. The same operation takes place on the depression of the resetting key 7. In this case a draw bar 732, and a resetting coupling-up lever 733, are drawn forward in the arrow direction "f" until the pawl 112 engages the nose 520 g of the same.

Both draw bars 730 and 732 are provided with noses 734 and 735. A lug 736 of a lever 737 fixed on a shaft 738 lies opposite to the noses 734 and 735. If one of the draw bars 730 or 732 is drawn forward in the arrow direction "f" then the lug 736 is carried along by the noses 734 or 735 of these draw bars, and the shaft 738, (Figures 13 and 15) is rotated in the clockwise direction. To the other end of the shaft 738 (Figure 15) there is fastened a lever 739, the lug 740 of which projects into a recess 741 of the draw bar 703 of the carriage left shift key 10. If the shaft 738 is rotated in the clockwise direction, then the lug 740 of the lever 739 pushes the draw bar 703 forwards whereby the carriage left shift key lever 445 is swung in the clockwise direction. By this means, the same action is obtained as if the carriage left shift key 10 itself is depressed. By this arrangement, accordingly on the depression of one of the resetting keys 7 or 8, the totalizer carriage is first of all moved into its extreme left hand position. On drawing forward the resetting clutching up levers 731 and 733, the projections 566a and 520a press on a roller 292 of a contact angle lever 291, and swing this against the action of its spring 297 in the anti-clockwise direction round a shaft 233. A contact angle lever 295 connected with the lever 291 is swung so that the contact lever 22, swingably attached to the same, is moved from the raised part 23 of the contact disc on to the lower projection 20i and the spring 295b as well as the contact spring 299 swings the contact lever 22 by its spring power in the anti-clockwise direction whereby the contact 300, 302 is closed. In consequence of this, the motor commences to run and likewise the main drive shaft 3. The crank arm 727 (Figures 6, 9 and 13) which, by way of a connecting rod 109 drives the resetting arm 547, the shaft 546 and the resetting arm 538, thus on the rotation of the shaft moves to and fro. To the resetting arm 538 are jointed resetting push rods 583 and 539 for the revolutions counter RC and the accumulator A. The resetting push rods 539 and 583 (Figures 3 and 16) are subjected to the action of tension springs 541 (Figure 16) and 584, which hold the resetting push rods, 539 and 583, so that their lugs 539a and 589 rest on resetting guides 544 and 588 fixed to the machine housing. If the push rods 539 and 583 are moved to and fro, they slide with their lugs 545 and 589a along underneath the resetting guides 544 and 588.

If the totalizer carriage as is shown in Figure 3 is in its extreme left hand position and if the resetting push rods 539 and 583, as hereinafter described in detail are raised, their lugs 539a and 589 engage the notches 549a (Fig. 3) and 590a of the racks 549 and 590. If thereupon, the resetting push rods 539 and 583 are moved to the right, their lugs 545 and 589a slide along on the upper sides 544g and 588g of the resetting guides 544 and 588 and prevent the lugs 539a and 589 from coming out of engagement with the notches 549a and 590a of the resetting racks before the extreme left hand position of the resetting push rods 539 and 583 is reached again. In like manner the resetting guides 544 and 588 prevent the lugs 539a and 589 of the resetting push rods being brought into engagement with the notches 549a and 590a of the resetting racks in any position other than the extreme left hand position of the resetting push rods 539 and 583 as the lugs 545 and 589a of the resetting push rods 539 and 583 if they during their to and fro movement are raised in another position than their extreme left hand position, move along on the underside of the resetting guides 544 and 588. In the resetting racks 549 and 590 only one notch 549a and 590a (Figure 3) is provided. This has the following reason: As will be seen from Figure 3, in the extreme left hand position of the push rod 539, the right edge of the lug 545 lies adjacent the left hand edge of the guide 544 with but very little play. Only in this position, the lug 545 of the push rod 539 passes by the left hand edge of the guide 544, if the push rod 539 is raised. Accordingly the lug 539a of the push rod 539 may enter the notch 549a of the resetting rack 549 only, when both the carriage C and the push rod 539 are in their extreme left hand position as illustrated in Figure 3. If, for instance, the carriage C is only somewhat displaced to the right while the push rod 539 is raised in its extreme left hand position, such raising is not possible, because the edge 549b of the rack 549 does not permit the lug 539a to raise high enough. Figure 20 shows on a large scale the relative position of the parts in that case. Owing to the displacement of the carriage somewhat to the right, the rack 549 appears also displaced to the same extent to the right in Figure 20, whereas the push rod 539 is still in its extreme left hand position. If now, the push rod 539 is raised as shown in Figure 20, the lug 539a abuts against the edge 549b which leaves the apex "v" of the wedge-like shaped lug 545 beneath the apex "w" of the wedge-shaped guide 544. Accordingly, if now the push rod 539 should be displaced to the right, the lug 545 slides beneath the guide 544 and takes the lug 539a down against the sliding face 544g of the slide 544, whereby the lug 539a is prevented from entering the notch 549a.

It may be noted in passing that if the lug 539a is permitted to enter the notch 549a in the left hand position of the carriage in which case the lug 545 slides on to the surface 544g of the guide 544, the lug 545 never drops down beyond the right hand edge of the guide 544, when the push rod 539 moves to the right.

The same is true with regard to the push rod 583 and the notch 590a.

In order to raise the resetting push rods 539 and 583 the following arrangement is provided.

In the movement of the resetting clutching up lever 731 in the clockwise direction, the arm 570 of the same presses on an intermediate lever 571 which is swingably mounted round a screw 573 (Figure 16) on the machine housing and is connected by means of a spring 575 with the clutching up lever 574. This lever raises the resetting push rod 583.

If now, the lug 589 cannot enter into the notch 590a for instance in any intermediate position of the carriage or if the resetting guide 588 prevents the lug 589a of the resetting push rod 583 from raising and if the key 8 is depressed and consequently the arm 570 of the resetting clutching lever 731 is swung in the clockwise direction, then the spring 575 is tensioned until such time as the lug 589 can enter into the notch 590a.

The same arrangement is provided for the resetting key 7. The arm 531 of the resetting clutching up lever 733 (Fig. 13) on the depression of the resetting key 7, presses on the lever 532 which is swingably mounted at 534 on the machine housing and is connected by a spring 742 with a lever 743 likewise swingably mounted at 534 which latter lever in its turn lifts the resetting push rod 539. From the foregoing it is evident that if one of the resetting keys 7 or 8 is depressed in any intermediate position of the carriage, the clutching up levers 733 or 731 rock their levers 532 or 571 in the clockwise direction, acting thereby through the intermediary of the springs 742 or 575 on the levers 743 or 574 in the clockwise direction too. Accordingly, they act on their resetting push rods 539 or 583. But as the edges 549b or 590b (Fig. 3) of the resetting racks 549 or 590 prevent the lugs 539a or 589 from raising, the rods 539 or 583 slide idly to and fro whereby their lugs 545 or 589a slide along the under side of the guides 544 or 588. As a result, the springs 742 or 575 are tensioned because on the one hand the levers 532 or 571 are rocked clockwise whereas on the other hand the levers 743 or 574 are prevented from rocking clockwise.

As hereinbefore mentioned, on depression of resetting keys 7 or 8 the carriage left shift key 10 was carried down along with them, whereby when the carriage was in an intermediary position the carriage movement to the left resulted and continued until the totalizer carriage had arrived in its extreme left hand position. On the downward movement of the carriage left shift key 10, the clutching lever 43 (Fig. 10) is rocked in the direction of the arrow "y" and releases the clutch dog 37. As a result the nose 44 of the clutch dog 37 engages the cam 45, clutching thereby the clutch housing 25 with the shaft 3. Through the parts 304, 291, 294, 295 and 22 the motor contact 300 and 302 is closed in the manner hereinbefore explained. As a consequence the shaft 3 and the clutch housing 25 are rotated in the direction of the arrow e, whereby, as has been pointed out, the carriage is shifted to the left. In order to prevent the resetting mechanism from being operated when the carriage shift mechanism is operated by depressing the carriage shift keys 10 or 11 directly, the following arrangement is provided. On the levers 731 and 733, noses 744 (Figure 14) and 745 are arranged. If now by depression of a carriage shift key 10 or 11, the clutch control lever 43 is rocked in the direction of the arrow y, the lug 304 of the clutch control lever 43 comes to lie in front of the noses 744 and 745. If in this position of the clutch control lever 43, a resetting key 7 or 8 is depressed, such depression is not possible since the co-operation of the lug 304 of the clutch control lever 43 with the noses 744 and 745 prevents the levers 731 and 733 from being rocked.

If the noses 744 and 745 are not provided the following could happen if the carriage is in its extreme left hand position. If in this case, for instance the resetting key 7 is depressed, the lug 539a enters its notch 549a on account of the fact that through the parts 732, 733, 532, 742 and 743 the push rod 539 is raised. This will be the case when the nose 735 of the rod 732 contacts the lug 736 of the lever 737. If it happens that the operator at that moment inadvertently depresses the carriage right shift key, the carriage shift clutch 45, 44 will be closed through the parts 704, 706, 708, 425b, 426, 287, 43 which is possible, because the lug 304 of the lever 43 would not find any resistance in its rocking movement in the direction of the arrow y, if no noses 744 and 745 were provided. As a result, the carriage would be shifted to the right while the lug 539a is in engagement with the notch 549a. As however, the displacement of the carriage to the right is of a greater extent than the displacement of the push rod 539 to the right it could happen that the parts get jammed, especially when the carriage is still moving to the right, whereas the rod 539 after having been moved to the right, slides again to the left. In order to prevent this undesired result, the noses 744 or 745 respectively are provided, which in the moment in which the noses 734 or 735 rock the lever 737, come to lie beneath the lug 304 of the clutch control lever 43. If, therefore, in that moment, the carriage right shift key 11 is depressed, this is not possible, because through the parts 704, 706, 708, 425b, 426, 287, the clutch control lever 43 may not be rocked in the direction of the arrow y on account of the fact that the nose 745 or 744 lies beneath the lug 304 of the clutch control lever 43. As now by further depression of the resetting key 7 the nose 735 rocks the parts 737, 738 and 739 clockwise the rod 703 is displaced in the direction of the arrow f whereby the lever 445 is rocked clockwise. This keeps the wiper 722 rocked in the anti-clockwise direction, owing to which a depression of the carriage right shift key is not possible. In other words, if the carriage right shift key 11 is depressed in advance of a resetting key, a depression of the latter is not possible on account of the fact that at that time the lug 304 of the clutch control lever 43 lies in front of the noses 744 and 745 of the levers 731 and 733. If however a resetting key is depressed in advance of the carriage right shift key 11, a depression of the latter is not possible because in the first place the noses 744 or 745 prevent such depression whereas later on as soon as they have passed in front of the lug 304, the wiper 722 prevents such depression.

As hereinbefore mentioned, the pawl 112 holds the resetting clutching up levers 731 and 733, on depression of the resetting keys 8 and 7 fast in the forward drawn position. To the right hand end of the above mentioned slide member 716 (Figures 13, 15, 17 and 18), a lever 746 is jointed by means of a screw 747. This lever engages with its slot 748, round a pin 749 of the pawl 112. If the totalizer carriage is not in its extreme left hand position, then the lever 746 takes up the position illustrated in Figure 18. The nose 750 mounted on the crank arm 727 therefore moves inoperatively past the nose 751 of the lever 746 on turning of the shaft 3. If the totalizer carriage, however, runs into its extreme left hand position, then the member 444 (Fig. 15) fixed to the totalizer carriage engages the lug 721 (Figure 15) of the member 716, and pushes the latter to the left against the action of the tension spring 720. If, therefore, the totalizer carriage has arrived in its extreme left hand position then the nose 750 (Figure 17), on the rotation of the crank arm 727, acts on the nose 751 of the lever 746 and swings this round the screw 747 in the anti-clockwise direction whereby the slot 748 of the lever 746 carries along with it the pin 749 of the pawl 112 so that the pawl is rotated in the clockwise direction and releases the noses 566g and 520g of the resetting clutching up levers 731 and 733.

This release preferably occurs in the position of the crank arm 727 shown in Figure 17, in which the resetting push rods 539 and 583 have already moved somewhat to the right, and lie with their lugs 545 and 589a on the resetting guides 544 and 588. Consequently, the parts 539a and 589 will therefore come into engagement with the notches 549a (Figure 3) and 590a of their resetting racks 549 and 590, and effect the resetting of the accumulator A and of the revolution counter RC, it being assumed that both resetting keys 7 and 8 were simultaneously depressed. If only one of these keys were depressed, then naturally only the resetting of the associated totalizer is effected.

On depression of one of the resetting keys, therefore, the carriage left shift is simultaneously and automatically effected by way of the parts 736 (Figure 13) 737, 738 (Fig. 15) 739 and 740 and on the arrival of the carriage in its extreme left hand position, the resetting mechanisms brought into the preparatory position by the springs 575 and 742 tensioned up to this point, are brought into the working position, so that the resetting mechanisms effect the zeroizing and the depressed resetting keys are released in dependence upon the totalizer carriage movement and in dependence upon the drive 3, 727, 750. The carriage left shift key 10 is released by way of the parts 736, 737 (Fig. 15) 738, 739, 740.

The carriage shift movement must, therefore, first be interrupted before the resetting operation may set in, as, however, the carriage left shift key 10 is held by the part 739 in its depressed position, provision is made by the connection, which is capable of being released, between the lug 705 of the draw bar 703 and the lever 707, whereby the carriage shift clutch, on the totalizer carriage running into its left hand position, is opened by way of the parts 444, 721, 716 and 717 in spite of the key 10 depressed being held inopportunely by the resetting key. If this has happened and if the resetting push rods 539 and 583 are brought into the working position, then the nose 750 (Fig. 17) acts on the nose 751 of the lever 746 whereby the pawl 112 is swung and the resetting keys released.

It will now be assumed that the totalizer carriage stands in the extreme left hand position. If now at the instant in which the nose 750 (Fig. 17) rests on the nose 751, the resetting key 7 or 8 is depressed, then the motor runs instantly and moves the nose 750 further. With former operation, however, the keys 7 or 8 are held depressed for an instant and this suffices for the crank 727 to turn sufficiently for the nose 750 to leave the nose 751 again, and the pawl 112 can fall so that the resetting clutching up levers 731 and 733 are held fast. In the beginning of the next revolution the resetting push rods 539 and 583 are raised by the tensioned springs 742 and 575 whereby the lugs 545 and 589 of the push rods move on to the guides 544g and 588g and the hooks 539a and 589 of the push rods enter into the notches 549a and 590a (Figure 13) and effect the resetting operation. During the course of the further rotation of the crank 727, the nose 750 again strikes on the nose 751 of the lever 746, whereby the latter is swung in the anti-clockwise direction and the pawl 112 is raised so that the resetting keys 7 and 8 can return to their rest position. If now one of the resetting keys 7 and 8 is depressed at the instant before the noses 750 and 751 lie opposite one another, the resetting push rods 539 and 583 are brought into connection with the resetting racks 549 and 590, and in the first rotation of the crank 727, the resetting of the totalizers and the return of the resetting keys 7 and 8 are effected, provided that these keys on depression are immediately again released.

This case can occur, if the totalizer carriage is first brought into the extreme left hand position by depression of the carriage left shift key 10 and shortly before the arrival in the same, one or both of the resetting keys 7, 8 are depressed.

Although in the illustrated example, the resetting mechanisms are in connection with the carriage left shift key, the resetting mechanism can equally well be connected with the carriage right shift key, for the case in which the resetting of the totalizers is only desired to be effected in the extreme right-hand position of the carriage in which arrangement naturally the position of the notches 549a and 590a must be changed. Likewise, it is clear that in similar manner the depression of the resetting keys can be effected in dependence upon the depression of the carriage shift keys.

In this case, a nose like the noses 734 or 735 should be provided on the rod 703 instead of the notch 741 and on the rods 730 and 732 notches like the notch 741 should be provided instead of the noses 734 and 735. If, with regard to such an arrangement the carriage left shift key 10 is depressed, the rod 703 will rock the lever 739, the shaft 738 and the lever 737 clockwise, whereby the rods 730 and 732 are displaced in the direction of the arrow f which brings about the same result as the arrangement 741, 740, 739, 738, 737, 736, 734, 735 illustrated in Figures 13 and 15.

In the following the resetting process of the numeral wheels is described.

Figure 2:
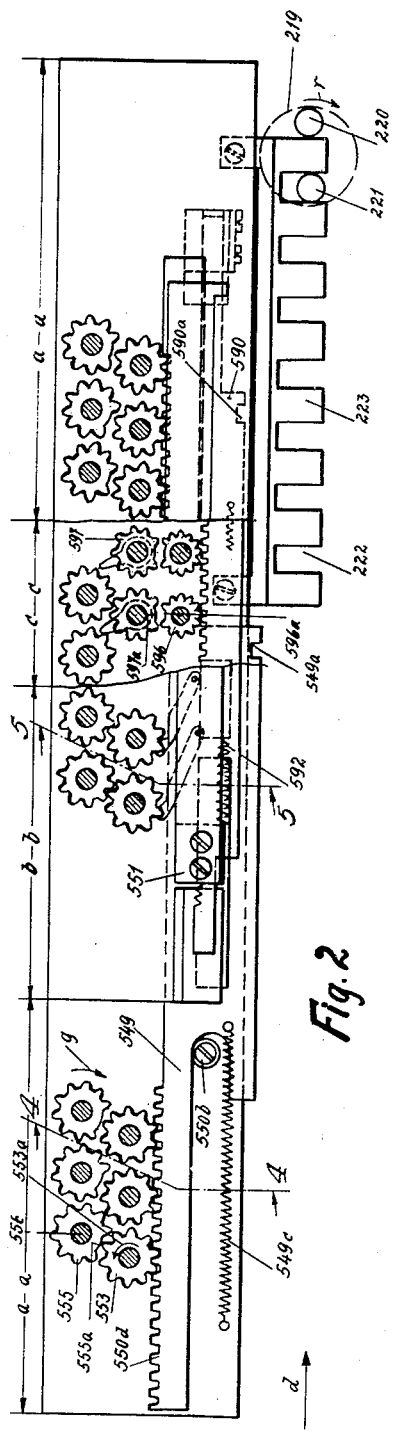
Figure 2 is a longitudinal section through the carriage and along the lines 2a—2a, 2b—2b, 2c—2c in Figure 5 viewed in the direction of the arrows at said lines.
Figure 4:
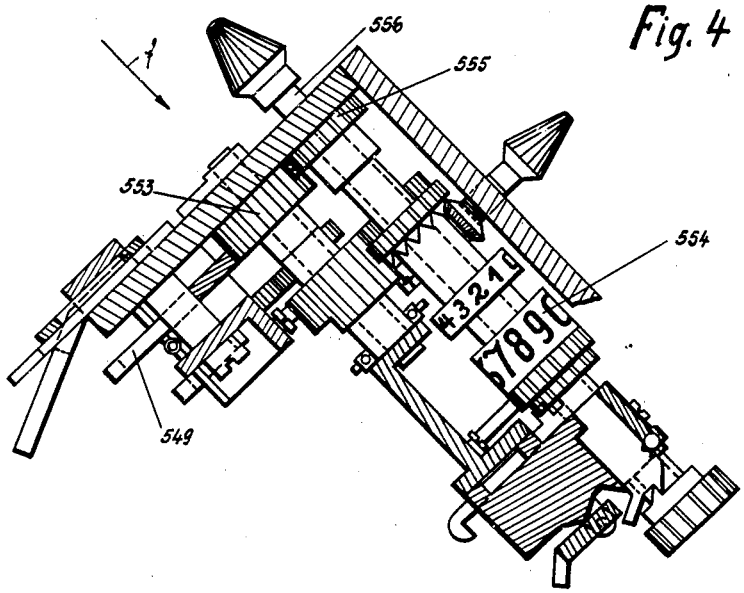
Figure 4 is a side view of a section along the line 4—4 of Figure 2, viewed in the direction of the arrows at said line.
Figure 4A:
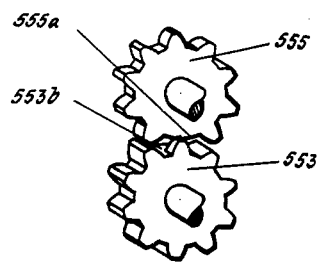
Figure 4a is a detail of Figure 4 in perspective seen in the direction of the arrow $f$ in Figure 4.

As may be seen from Figures 2 and 3, the resetting racks 549 and 590 are held in their left hand position by means of the springs 549c and 592 and the abutments 550b and 551. If, therefore, the lug 539a of the push rod 539 is in engagement with the notch 549a of the rack bar 549 and the push rod 539 moves to the right, the teeth 550d of the rack bar 549 rotate the wheels 553 (Figures 2 and 4) in the direction of the arrow 553a. These wheels have a tooth space 553b on half of their breadth as shown in Figure 4a. On the numeral wheel shafts 556 the wheels 555 and the numeral wheels 554 of the accumulator are fixed. When the numeral wheels 555 are in their zero position, the tooth space 555a of the same is opposite the tooth space 553b. If, however, the numeral wheels 554 indicate any other digit than "0" the teeth of the wheels 555 are positioned in the tooth space 553b of the wheels 553. Accordingly, if the wheels 553 are rotated in the direction of the arrow 553a, the wheels 555, the shafts 556 and the numeral wheels 554 are rotated in the direction of the arrow g until the tooth spaces 555a are opposite the tooth spaces 553b. If this is the case and the rack bar 549, should still be moved to and fro, this will only result in an idle rotation of the wheels 553.

Figure 5:
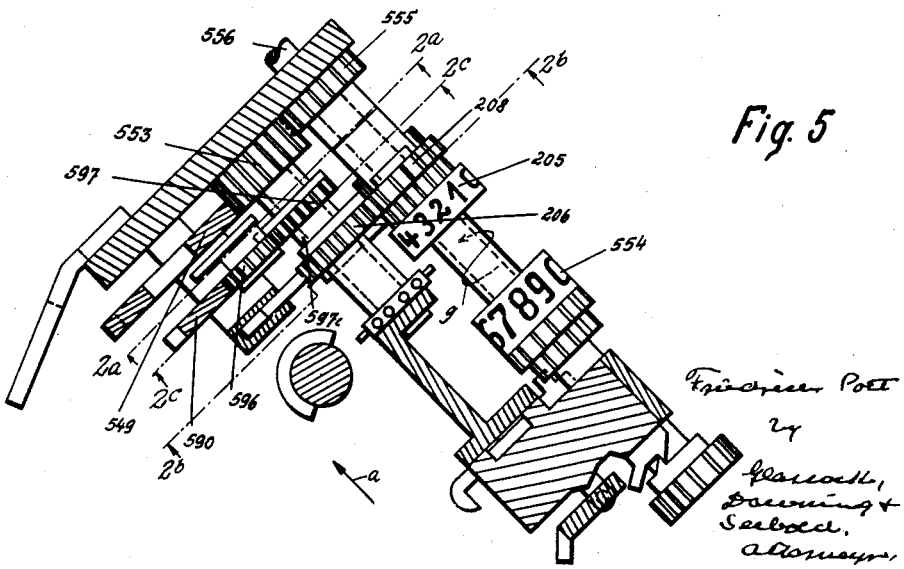
Figure 5 is a section along the line 5—5 of Figure 2, viewed in the direction of the arrows at said line.

The resetting arrangement for the revolution counter is as follows:

The resetting rack bar 590 engages with the wheels 596 which have an enlarged tooth space 596a, formed by the cutting out of one tooth. The wheels 596 are in mesh with wheels 597 (Figure 5) fixed on sleeves 597c. On this sleeve are fixed the wheels 206 which are in mesh with the wheels 208 which are fixed to the numeral wheels 205 of the revolution counter RC. The wheels 208 and 205 are rotatably mounted on shaft 556. The wheels 597 have also an enlarged tooth space 597a. If the numeral wheels 205 assume their zero position, the tooth spaces 596a and 597a lie opposite each other. If, therefore, in this case the wheels 597 are rotated, their teeth will pass through the tooth space 596a of the wheels 596 without rotating them. On the other hand, if the wheels 596 are rotated, their teeth will pass through the tooth space 596a of the wheels 596 without rotating them. If, however, a tooth of the wheels 597 is positioned in the tooth space 596a of the wheels 596 owing to the fact that the numeral wheels 205 show any other digit than "0", the wheels 596 on displacement of the rack bar 590 to the right are rotated in the anti-clockwise direction, rotating thereby the wheels 597 in the clockwise direction until the tooth spaces 596a are opposite the tooth spaces 597a. As a result, the wheels 208 and the numeral wheels 205 are rotated in the anti-clockwise direction. As soon as the tooth spaces 596a and 597a are opposite each other, a continued to and fro movement of the rack bar 590 does not harm, since the wheels 596 are thereby rotated idly without rotating the wheels 597.

I claim as my invention:

1. In a machine of the class described, the combination of a carriage shiftable from a home position to a plurality of spaced operative positions, a totalizer on said carriage, a carriage shifting mechanism, a resetting mechanism for the totalizer including a power driven member and a member for resetting the totalizer, separate manually operable means for controlling the operation of each mechanism, a connection between the control means for the two mechanisms and operable by the control means for the resetting mechanism to actuate the control means for the carriage shifting mechanism and thereby effect the shifting of the carriage to the home position and means operable only when the carriage has reached its home position to establish a connection between the power driven member and the resetting member to actuate the latter.

2. In a machine of the class described, the combination of a carriage shiftable from a home position to a plurality of spaced operative positions, totalizers on said carriage, a power drive, a carriage shifting mechanism, a resetting mechanism for said totalizers including resetting members and members driven by the power drive, means to effect a driving connection between the power driven members and the resetting members only when said carriage is in its home position, a plurality of manually operable means for controlling the operation of the carriage shifting mechanism and the power driven members, and a connection between the several manually operable control means and operable by the manually operable control means for the power driven members to actuate the manually operable control means for the carriage shifting mechanism and thereby effect the shifting of the carriage to the home position, the connecting means operating, when the carriage arrives in its home position, to establish a connection between the power driven members and the resetting members for operating the latter.

3. In a machine of the class described, the combination of a carriage shiftable from a home position to a plurality of spaced operative positions, totalizers on said carriage, a power drive, a carriage shifting mechanism, a resetting mechanism for said totalizers including resetting members and members driven by the power drive, means to effect a driving connection between the power driven members and the resetting members only when said carriage is in its home position, a plurality of manually operable means for controlling the operation of the carriage shifting mechanism and the power driven members, and a connection between the several manually operable control means and operable by the manually operable control means for the power driven members to actuate the manually operable control means for the carriage shifting mechanism and thereby effect the shifting of the carriage to the home position, the connecting means operating, when the carriage arrives in its home position, to establish a connection between the power driven members and the resetting members for operating the latter, means to retain the control means for the power driven members in operative position, means operated upon movement of the carriage into its home position, and a member rendered effective by said last named means and actuated by said power drive for releasing the retaining means.

4. A machine as claimed in claim 2, characterized by the provision of means tensioned by operation of the manually operable means related to said power driven members for actuating said connecting means and establishing the driving connection between the power driven members and said resetting members upon movement of said carriage into its home position.

5. In a machine of the class described, the combination of a carriage shiftable from a home position to a plurality of spaced operative positions, totalizers on said carriage, a power drive, a carriage shifting mechanism, a resetting mechanism including resetting members and members driven by the power drive, means to effect a driving connection between the power driven members and the resetting members only when said carriage is in its home position, a plurality of manually operable means for controlling the operation of the carriage shifting mechanism and the power driven members, and a connection between the several manually operable control means and operable by the manually operable control means for the power driven members to actuate the manually operable control means for the carriage shifting mechanism and thereby effect the shifting of the carriage to the home position, the connecting means operating, when the carriage arrives in its home position, to establish a connection between the power driven members and the resetting members for operating the latter, a spring actuated latch for holding the manually operable means controlling the power driven members in effective position, a member actuated upon movement of the carriage into its home position, and means rendered effective by said carriage actuated member and actuated by said power drive to actuate said latch and to release said manually operable means.

6. In a machine of the class described, the combination of a carriage shiftable from a home position to a plurality of spaced operative positions, totalizers on said carriage, a power drive, a carriage shifting mechanism, a resetting mechanism for said totalizers including resetting members and members driven by the power drive, means to effect a driving connection between the power driven members and the resetting members only when said carriage is in its home position, a plurality of manually operable means for controlling the operation of the carriage shifting mechanism and the power driven members, and a connection between the several manually operable control means and operable by the manually operable control means for the power driven members to actuate the manually operable control means for the carriage shifting mechanism and thereby effect the shifting of the carriage to the home position, the connecting means operating, when the carriage arrives in its home position to establish a connection between the power driven members and the resetting members for operating the latter, a spring actuated latch for holding said manually operable means controlling the power driven members in effective position, a displaceable slide, a nose on said slide engageable by the carriage upon movement of said carriage into its home position, and means rendered effective by said slide and actuated by said power drive for releasing said latch.

7. In a machine of the class described, the combination of a carriage shiftable from a home position to a plurality of spaced operative positions, totalizers on said carriage, a power drive, a carriage shifting mechanism, a resetting mechanism for said totalizers including resetting members and members driven by the power drive, means to effect a driving connection between the power driven members and the resetting members only when said carriage is in its home position, a plurality of manually operable means for controlling the operation of the carriage shifting mechanism and the power driven members, and a connection between the several manually operable control means and operable by the manually operable control means for the power driven members to actuate the manually operable control means for the carriage shifting mechanism and thereby effect the shifting of the carriage to the home position, the connecting means operating, when the carriage arrives in its home position, to establish a connection between the power driven members and the resetting members for operating the latter, a spring actuated latch for holding the manually operable means controlling the power driven members in effective position, a displaceable slide brought into rest position upon the movement of the carriage into its home position and limiting the movement of the carriage, and means rendered effective by the displacement of said slide and actuated by said power drive to release said latch.

8. In a machine of the class described, the combination of a carriage shiftable from a home position to a plurality of spaced operative positions, totalizers on said carriage, a power drive, a carriage shifting mechanism, a resetting mechanism for said totalizers including resetting members and members driven by the power drive, means to effect a driving connection between the power driven members and the resetting members only when said carriage is in its home position, a plurality of manually operable means for controlling the operation of the carriage shifting mechanism and the power driven members, and a connection between the several manually operable control means and operable by the manually operable control means for the power driven members to actuate the manually operable control means for the carriage shifting mechanism and thereby effect the shifting of the carriage to the home position, the connecting means operating, when the carriage arrives in its home position, to establish a connection between the power driven members and the resetting members for operating the latter, a spring actuated latch for holding the manually operable means controlling the power driven members in effective position, a projection on said carriage, means operated by said projection upon movement of the carriage into its home position, means rendered effective by said projection operated means and actuated by said power drive for releasing said latch and movable into a position in which said latch may freely move into holding position.

9. In a machine of the class described, the combination of a carriage shiftable from a home position to a plurality of spaced operative positions, totalizers on said carriage, a power drive, a carriage shifting mechanism, a resetting mechanism for said totalizers including resetting members and members driven by the power drive, means to effect a driving connection between the power driven members and the setting members only when said carriage is in its home position, manually operable means for controlling said resetting mechanism, manually operable means for controlling said shifting mechanism, a connection between the several manually operable means and operable by the first mentioned manually operable means to actuate the second mentioned manually operable means and thereby effect the shifting of the carriage to the home position, said connecting means operating, when the carriage has reached its home position, to establish a connection between the power driven members and the resetting members for operating the latter, a latch for holding the first mentioned manually operable means in effective position, means actuated by said power drive for releasing said latch and movable into effective and ineffective positions, carriage operated means for moving said releasing means into effective position upon movement of the carriage into its home position, the second mentioned manually operable means including a pair of keys to determine the direction of movement of the carriage, and means on said carriage operated means coacting with said keys for alternately rendering the latter ineffective in different positions of said carriage operated means.

10. In a machine of the class described, the combination of a carriage shiftable from a home position to a plurality of spaced operative positions, totalizers on said carriage, a power drive, a carriage shifting mechanism, a resetting mechanism for said totalizers including resetting members and members driven by the power drive, means to effect a driving connection between the power driven members and the resetting members only when said carriage is in its home position, manually operable means for controlling said resetting mechanism, manually operable means for controlling said shifting mechanism, a connection between the several manually operable means and operable by the first mentioned manually operable means to actuate the second mentioned manually operable means and thereby effect the shifting of the carriage to the home position, said connecting means operating, when the carriage has reached its home position, to establish a connection between the power driven members and the resetting members for operating the latter, a latch for holding the first mentioned manually operable means in effective position, means actuated by said power drive for releasing said latch and movable into effective and ineffective positions, carriage operated means for moving said releasing means into effective position upon movement of the carriage into its home position, the second mentioned manually operable means including a pair of keys to determine the direction of movement of the carriage and key members operable by said keys and disengageable from the shifting mechanism, means normally retaining said key members in operative position with respect to the shifting mechanism, and means on said carriage operated means alternately engageable with the key members to disengage the latter from the shifting mechanism.

11. In a machine of the class described, the combination of a carriage shiftable from a home position to a plurality of spaced operative positions, totalizers on said carriage, a power drive, a carriage shifting mechanism, a resetting mechanism for said totalizers including resetting members and members driven by the power drive, means to effect a driving connection between the power driven members and the resetting members only when said carriage is in its home position, manually operable means for controlling said resetting mechanism, manually operable means for controlling said shifting mechanism, a connection between the several operable means and operable by the first mentioned manually operable means to actuate the second mentioned manually operable means and thereby effect the shifting of the carriage to the home position, said connecting means operating, when the carriage has reached its home position, to establish a connection between the power driven members and the resetting members for operating the latter, a latch for holding the first mentioned manually operable means in effective position, means actuated by said power drive for releasing said latch and movable into effective and ineffective positions, carriage operated means for moving said releasing means into effective position upon movement of the carriage into its home position, the second mentioned manually operable means including a pair of keys to determine the direction of movement of the carriage, and key members operable by said keys and disengageable from said shifting mechanism, means on said carriage operated means coacting with said key members to alternately disengage the latter from the shifting mechanism in different positions of said carriage operated means, and spring means normally urging the key members into engaging position and normally tending to move said releasing means into a position intermediate said two positions.

12. In a machine of the class described, the combination of a carriage shiftable from a home position to a plurality of spaced operative positions, totalizers on said carriage, a power drive, a carriage shifting mechanism for shifting the carriage in said positions and including a clutch operated by the power drive and a control member for said clutch, a carriage shifting key for actuating said clutch control member, a resetting mechanism for said totalizers including resetting members and members driven by the power drive, means to effect a driving connection between the power driven members and the resetting members only when said carriage is in its home position, manipulative means for controlling the operation of the power driven members, a connection between the manipulative means and said key and operable by the manipulative means for the power driven members to actuate said key and thereby effect the shifting of the carriage to the home position, the connecting means operating, when the carriage arrives in its home position, to establish a connection between the power driven members and the resetting members for operating the latter, and a locking mechanism between said manipulative means and said key, said manipulative means being ineffective in the first part of its operative movement to actuate said connection whereby said ineffective movement of said manipulative means moves said locking mechanism to ineffective position prior to the actuation of said key by the manipulative means.

FRIEDRICH POTT.